(12) United States Patent
Tang

(10) Patent No.: US 11,132,211 B1
(45) Date of Patent: Sep. 28, 2021

(54) NEURAL FINITE STATE MACHINES

(71) Applicant: Yichuan Tang, Santa Clara, CA (US)

(72) Inventor: Yichuan Tang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 16/510,261

(22) Filed: Jul. 12, 2019

Related U.S. Application Data

(60) Provisional application No. 62/818,972, filed on Mar. 15, 2019, provisional application No. 62/735,448, filed on Sep. 24, 2018.

(51) Int. Cl.
| | |
|---|---|
| *G06F 9/44* | (2018.01) |
| *G06F 9/448* | (2018.01) |
| *G06N 3/04* | (2006.01) |
| *G06N 20/00* | (2019.01) |
| *G06F 17/18* | (2006.01) |

(52) U.S. Cl.
CPC ............ *G06F 9/4498* (2018.02); *G06F 17/18* (2013.01); *G06N 3/0472* (2013.01); *G06N 20/00* (2019.01)

(58) Field of Classification Search
CPC ........................................................ G06F 9/44
See application file for complete search history.

(56) References Cited

U.S. PATENT DOCUMENTS

| | | | | |
|---|---|---|---|---|
| 5,291,499 A | * | 3/1994 | Behrens ............. | G11B 20/1426 714/796 |
| 5,506,933 A | * | 4/1996 | Nitta ..................... | G10L 15/144 704/204 |
| 5,903,886 A | | 5/1999 | Heimlich et al. | |
| 5,943,659 A | | 8/1999 | Giles et al. | |
| 6,411,147 B1 | * | 6/2002 | Casteel ................. | H02M 1/082 327/199 |
| 8,429,096 B1 | * | 4/2013 | Soundararajan ...... | G06F 16/217 706/12 |
| 8,463,925 B1 | * | 6/2013 | Nath ..................... | H04L 69/161 709/230 |
| 10,049,106 B2 | | 8/2018 | Goyal et al. | |
| 10,049,325 B2 | * | 8/2018 | Shimomura .......... | G06N 7/005 |
| 10,832,093 B1 | * | 11/2020 | Taralova ................ | G06F 30/20 |
| 2002/0181462 A1 | * | 12/2002 | Surdila ................. | H04L 47/825 370/392 |
| 2008/0208372 A1 | * | 8/2008 | Pannese ............... | G05B 13/027 700/48 |
| 2010/0302129 A1 | * | 12/2010 | Kastrup ................ | G06F 3/1446 345/1.3 |
| 2012/0078769 A1 | * | 3/2012 | Becher .................. | G06Q 40/04 705/37 |
| 2016/0191972 A1 | * | 6/2016 | Rao .................. | H04N 21/26225 725/34 |
| 2017/0032283 A1 | * | 2/2017 | Kamiya ................ | G01B 21/02 |
| 2017/0140269 A1 | * | 5/2017 | Schaul .................... | G06N 3/08 |
| 2017/0195345 A1 | * | 7/2017 | Maresca ............. | H04L 63/1416 |

(Continued)

*Primary Examiner* — Jae U Jeon
(74) *Attorney, Agent, or Firm* — Young Basile Hanlon & MacFarlane, P.C.

(57) ABSTRACT

A system includes a state-dependent action policy and a state-dependent transition policy. The state-dependent action policy determines an action based on environment states and a current agent state selected from a predetermined group of agent states. The state-dependent transition policy is implemented using one or more machine learning models and is configured to control transitions between agent states from the predetermined group of agent states.

24 Claims, 8 Drawing Sheets

(56) References Cited

U.S. PATENT DOCUMENTS

| | | | |
|---|---|---|---|
| 2017/0372442 A1* | 12/2017 | Mejias | G16H 40/20 |
| 2018/0137854 A1 | 5/2018 | Perez | |
| 2018/0293491 A1 | 10/2018 | Ma et al. | |
| 2019/0020555 A1* | 1/2019 | Tayal | H04L 67/1012 |
| 2019/0041808 A1* | 2/2019 | Hada | G05B 13/027 |
| 2019/0250568 A1* | 8/2019 | Li | G06N 3/08 |
| 2019/0266492 A1* | 8/2019 | Harang | G06N 3/082 |
| 2019/0274630 A1* | 9/2019 | Wakita | A61B 5/7228 |
| 2020/0043610 A1* | 2/2020 | Al Hasan | G16H 50/70 |

* cited by examiner

NEURAL FINITE STATE MACHINES

CROSS-REFERENCE TO RELATED APPLICATIONS

This application claims the benefit of U.S. Provisional Application No. 62/818,972, filed on Mar. 15, 2019 and U.S. Provisional Application No. 62/735,448, filed on Sep. 24, 2018, the contents of which are hereby incorporated herein by reference for all purposes.

TECHNICAL FIELD

This disclosure relates to neural finite state machines.

BACKGROUND

Finite state machines are mathematical models of computation in which a limited number of states are defined. Each state is associated with actions to be taken in the state. Transitions can be made between states. Typically, a transition from a first state to a second state is performed when a condition is satisfied.

SUMMARY

One aspect of the disclosure is a system that includes a state-dependent action policy and a state-dependent transition policy. The state-dependent action policy determines an action based on environment states and a current agent state selected from a predetermined group of agent states. The state-dependent transition policy is implemented using one or more machine learning models and is configured to control transitions between agent states from the predetermined group of agent states.

Another aspect of the disclosure is a method that includes obtaining information that describes environment states; obtaining information that indicates a current agent state; determining a transition probability for switching from the current agent state to a different agent state using a trained machine learning model based on the environment states and the current agent state; and transitioning from the current agent state to the different agent state if the transition probability exceeds a threshold value.

Another aspect of the disclosure is a method that includes training a transition network to determine a transition probability for switching from a current agent state to a different agent state based on environment states. Training the transition network may be performed using a reinforcement learning system. The method may also include training a policy network to determine an action to be performed in the current agent state based on the environment states.

Another aspect of the disclosure is a system that includes a first agent policy that is operable to control actions of an agent in a first state; a second agent policy that is operable to control actions of the agent in a second state; and a transition network that is configured to determine a transition probability for a state change between the first agent state and the second agent state based on environment states.

Another aspect of the disclosure is a traffic control system that includes a first policy network that controls illumination states for traffic signals in a first state; a second policy network that controls illumination states for traffic signals in a second state; and a transition network that determines a transition probability for a state change between the first state and the second state, and causes the state change if the transition probability exceeds a threshold value.

Another aspect of the disclosure is a vehicle control system that includes a first policy network that controls motion of a vehicle in a lane following state in which the vehicle remains in a current lane on a roadway; a second policy network that controls motion of a vehicle in a lane change state in which the vehicle moves from the current lane to a different lane on the roadway; and a transition network that determines a transition probability for a state change between the lane following state and the lane change state, and causes the state change if the transition probability exceeds a threshold value.

DETAILED DESCRIPTION

Figure 1:
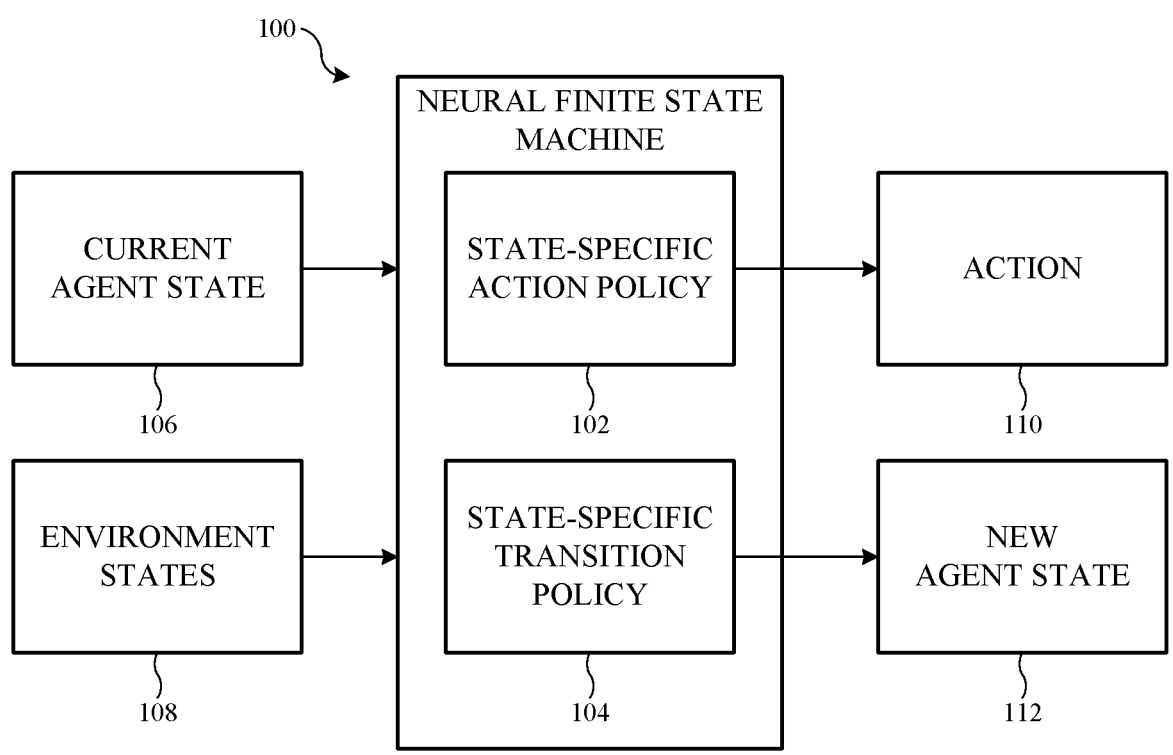
FIG. 1 is a block diagram that shows a neural finite state machine according to a first example.

The ability to learn to make sophisticated and robust sequential decisions is the hallmark of artificial intelligence (AI) systems. Recently, deep reinforcement learning (RL) applications have matched and then surpassed the best human performance in board games and video games. However, deep RL techniques are not yet the de-facto technique employed in most mission critical robotic applications. Unlike in games, it is often difficult to build a realistic simulator for training, leading to difficulty in the transfer of learned policies. In addition, by relying on deep neural nets, deep RL techniques benefit from a powerful policy network but struggle with the "black-box" nature of the representation, which can create uncertainty as to how unusual situations will be handled.

The systems and methods herein are directed to a neural finite state machine (NFSM), which utilizes the high-level structure of the finite state machine, while utilizing a deep neural network that is trained to determine when to make state-transitions and is trained to learn policies for each state. The states that an NFSM may operate in are referred to herein as "agent states" for clarity.

The NFSM combines the complex decision-making abilities of deep RL techniques with the constraints of a finite state machine. Instead of a general deep neural network (DNN) policy function for the agent, the agent decision making process is instead modeled by a finite state machine, where the probability of a transition from a first agent state to a second agent state is determined by a state-dependent, data dependent neural network. The action output by the agent is different for different states of the state machine, allowing us to engineer different levels of allowable complexity for different states. Since the policies are state-dependent, they can be constrained based on conditions that are associated with the state, leading to a higher level of certainty regarding the decisions that will be made by the policy.

To summarize, in an NFSM, transitions from one state to other states in the NFSM are learned by a neural network, and the action output from any given state is also learned by a different neural network, which is specific to the state. As a result, the actions output by each state can be very different and can be constrained as appropriate for the given state. As a result, the NFSM constrains the final agent policy, improving generalization, the NFSM is a learning method-neutral model, and can be trained by many different algorithms, and the NFSM is more interpretable than other machine learning models, because the decisions made by the NFSM can be interpreted based on the state that the policy was in when the decision was made.

In a basic implementation of an NFSM, there are two neural networks for every state in the NFSM. A first neural network for each state determines when and whether to transition to another state, and the second neural network is a state-conditional policy function.

Efficient processing can be facilitated by an NFSM architecture that utilizes weight-sharing and gating. Weight-sharing and gating may be implemented in an NFSM in a manner similar to implementations of multi-task learning, in which most of the parameters of the state-dependent neural networks are shared across all of the finite-states. A four-state NFSM according to a second implementation utilizes weight-sharing and gating. In the four-state NFSM, an observation input vector is used to provide context and describes the environment information around an agent. The observation input vector is the same for all states the agent would be in. The observation vector is the first part of the input to the neural network. The second input is a one-hot vector that encodes of the state. For example, when the agent is in state 0, the one-hot state encoding will be [1; 0; 0; 0], for state 1 it will be [0; 1; 0; 0], and so on. These two inputs undergo fusion at a later stage via gating, resulting in a state-dependent action and transition probability output.

FIG. 1 is a block diagram that shows a neural finite state machine (NFSM) 100 according to a first example. The NFSM 100 is an agent that determines outputs The NFSM 100 may be implemented using one or more trained machine learning models, such as one or more deep neural networks. As an example, the NFSM 100 may include one or more machine learning models that have been trained using reinforcement learning techniques.

The NFSM 100 includes a state-dependent action policy 102 and a state-dependent transition policy 104. The state-dependent action policy 102 and the state-dependent transition policy 104 may be machine learning-based models that are trained using machine learning techniques. As inputs, the NFSM 100 receives a current agent state 108 and environment states 106 (e.g., current environment states). As outputs, the NFSM 100 generates an action 110 and a new agent state 112.

The NFSM 100 is an agent that is operable to determine actions to be performed based on input information. In the illustrated example, the NFSM 100 determines the action 110 based on the environment states 106. The environment states 106 are information that describe an environment that the NFSM 100 is operating in. The environment states 106 may be observations made relative to a real-world environment (e.g., using sensors), relative to a simulated environment (e.g., using parameter values available through a simulator), or observations made relative to any other real-world or virtual process (e.g., values associated with variables during execution of a computer program). As an example, the environment states 106 may be in the form of information that is obtained from sensors.

The determinations made by the NFSM 100 are constrained by the current agent state 108. The NFSM 100 is a type of state machine, and the current agent state indicates that state that the NFSM 100 is currently operating in. In operation, the NFSM 100 will make a series of determinations, such as by determining the action 110 and the new agent state 112 at each time step during a series of time steps.

In a simple example, an autonomous vehicle could be implemented using the NFSM 100. In this example, the states of the NFSM 100 could include states that correspond to "lane following," in which permissible actions include steering in a manner that keeps the vehicle in the current lane on a roadway and "lane change," in which permissible actions include steering in a manner that causes the vehicle to enter a different lane on the roadway.

The state-dependent action policy 102 determines the action 110. The state-dependent action policy 102 may be implemented using one or more machine learning models. The inputs utilized by the state-dependent action policy 102 include the current agent state 108 and the environment states 106. The actions that may be taken by the NFSM 100 are constrained by the agent state that the NFSM 100 is operating under.

As an example, the state-dependent action policy 102 may determines the action 110 based on the environment states 106 and the current agent state 108 selected from a predetermined group of agent states that the NFSM 100 may operate in. The state-dependent action policy 102 may be implemented using one or more machine learning models, such as one or more deep neural networks. Implementing the state-dependent action policy 102 using one or more neural networks may be performed using separate machine learning models for each possible agent state for the NFSM 100 or may be performed using a single machine learning model that utilizes the current environment states and the current agent state as inputs. In some implementations, as will be discussed further herein, the state-dependent action policy 102 may include one or more machine learning models that are trained using reinforcement learning techniques.

The action 110 that is determined by the state-dependent action policy 102 may be performed by a real-world system or a virtual system relative to the real or virtual environment. The action 110 may change one or more of the states of the states that are included in the environment states 106. Thus, subsequent to performance of the action 110, new observations may be made of the real or virtual environment that the NFSM 100 is operating in, and the environment states 106 may be updated accordingly for use in a subsequent time step.

The state-dependent transition policy 104 determines the new agent state 112. The state-dependent action policy 102 may be implemented using one or more machine learning models. The inputs utilized by the state-dependent transition policy 104 include the current agent state 108 and the environment states 106. The current agent state 108 constrains operation of the state-dependent transition policy. As one example, the probability of transitioning to a particular state may be dependent in part on the current agent state 108. As another example, the permissible states that can be selected for the new agent state 112 may be dependent on the current agent state 108.

As an example, the state-dependent transition policy 104 may be implemented using one or more machine learning models and may be configured to control transitions between agent states from the predetermined group of agent states. The state-dependent transition policy 104 may be configured to control the transitions between the agent states based on the environment states 106. In some implementations, the state-dependent transition policy 104 may include separate machine learning models for each agent state of the NFSM 100. In some implementations, the state-dependent transition policy 104 may be implemented using a single machine learning model that utilizes the environment states 106 and the current agent state 108 as inputs (e.g., configured using weight-sharing and gating), as will be described further herein. In some implementations, as will be discussed further herein, the state-dependent transition policy 104 may include one or more machine learning models that are trained using reinforcement learning techniques.

The new agent state 112 that is determined by the state-dependent transition policy 104 indicates the agent state to be used as a constraint upon the state-dependent action policy 102 and the state-dependent transition policy 104 in a subsequent determination (e.g., at a subsequent time step). If the value of the new agent state 112 is different than the current agent state 108, the value of the current agent state 108 state may be set to the value of the new agent state 112. By updating the value of the current agent state 108, the determinations that are made by the NFSM 100 in the subsequent time step will be subject to a different set of constraints, according to the changed state of the NFSM 100.

In some implementations, the state-dependent action policy 102 and the state-dependent transition policy 104 may be implemented using a single neural network, as will be described further herein with respect to a specific implementation.

Figure 2:
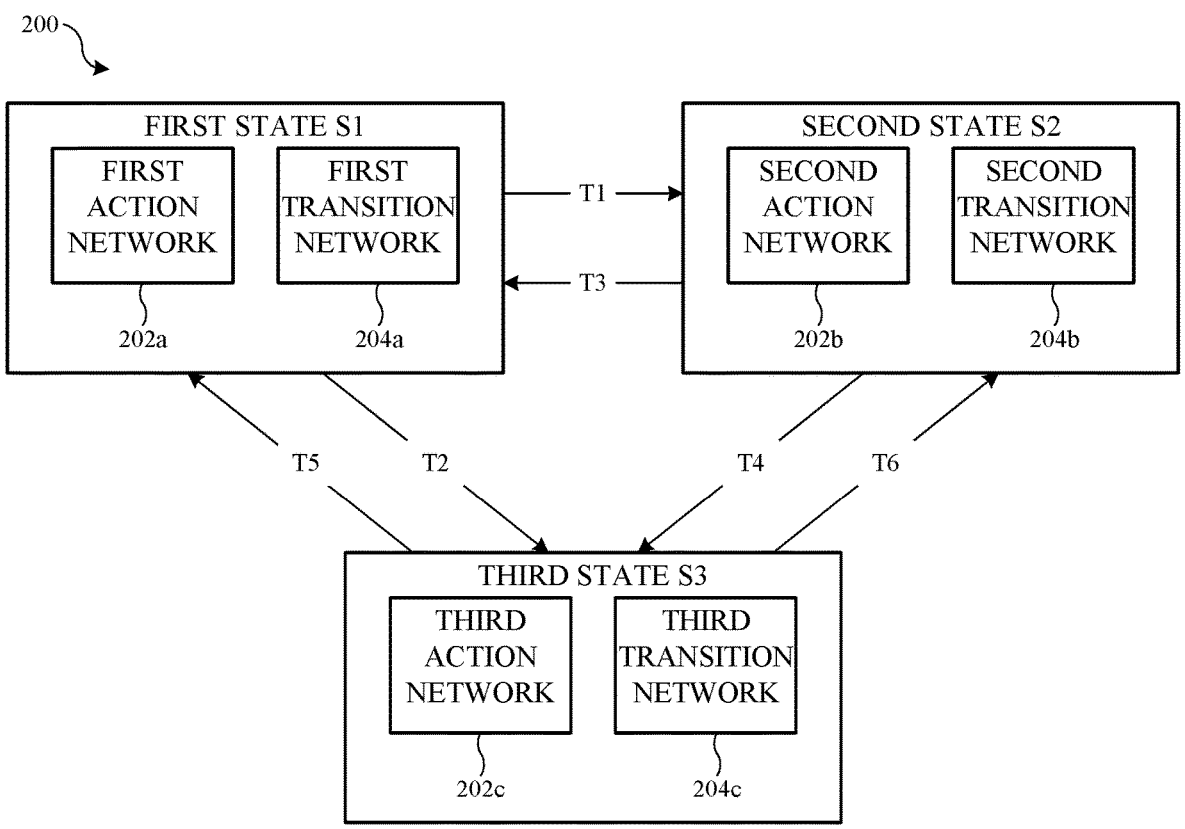
FIG. 2 is a block diagram that shows a neural finite state machine according to a second example.

FIG. 2 is a block diagram that shows a neural finite state machine (NFSM) 200 according to a second example. The NFSM 200 includes a first state S1, a second state S2, and a third state S3. It should be understood that the NFSM 200 can be implemented such that it has any number of states. In addition, the NFSM 200 can be implemented using a hierarchical structure, in which one or more of the states are associated with substates that further constrain operation of the NFSM 200 and may have particular transition conditions. For example, a state may be defined such that a particular substate must be entered before a state transition to a different state can be performed.

The first state S1 is implemented by a first action network 202*a* and a first transition network 204*a*. The second state S2 is implemented by a second action network 202*b* and a second transition network 204*b*. The third state S3 is implemented by a third action network 202*c* and a third transition network 204*c*.

The first action network 202*a*, the second action network 202*b*, and the third action network 202*c* are policies, each implemented using a separate machine learning model (e.g., a deep neural network), that control the actions determined by the NFSM 200. Thus, the first action network 202*a*, the second action network 202*b*, and the third action network 202*c* cooperate to define a state-dependent action policy for the NFSM 200. Combined operation of the first action network 202*a*, the second action network 202*b*, and the third action network 202*c* is as described with respect to the state-dependent action policy 102 of the NFSM 100, except as otherwise stated herein.

The first transition network 204*a*, the second transition network 204*b*, and the third transition network 204*c* are policies, each implemented using a separate machine learning model (e.g., a deep neural network), that control the state transitions for the NFSM 200. Thus, the first transition network 204*a*, the second transition network 204*b*, and the third transition network 204*c* cooperate to define a state-dependent transition policy for the NFSM 200. Combined operation of the first transition network 204*a*, the second transition network 204*b*, and the third transition network 204*c* is as described with respect to the state-dependent transition policy 104 of the NFSM 100, except as otherwise stated herein.

Each of the first transition network 204*a*, the second transition network 204*b*, and the third transition network 204*c* can utilize environment states as inputs, as described with respect to the environment states 106. The first transition network 204*a*, the second transition network 204*b*, and the third transition network 204*c* do not require knowledge of the current state of the NFSM 200, because each one is utilized only when a particular corresponding state is active. Thus, each of the first transition network 204*a*, the second transition network 204*b*, and the third transition network 204*c* can be configured to operate only when the corresponding state is active, such as by utilizing a trained machine learning model for each that is trained to determine whether to transition from a single state to one or more other states.

In the illustrated example, the first transition network 204*a* determines state transitions when the NFSM 200 in operating in the first state S1, and is operable to maintain operation of the NFSM 200 is the first state S1, to direct the NFSM 200 to make a first state transition T1 from the first state S1 to the second state S2, or to direct the NFSM 200 to make a second state transition T2 from the first state S1 to the third state S3.

The second transition network 204*b* determines state transitions when the NFSM 200 is operating in the second state S2, and is operable to maintain operation of the NFSM 200 in the second state S2, to direct the NFSM 200 to make a third state transition T3 from the second state S2 to the first state S1, or to direct the NFSM 200 to make a fourth state transition T4 from the second state S2 to the third state S3.

The third transition network 204*c* determines state transitions when the NFSM 200 is operating in the third state S3, and is operable to maintain operation of the NFSM 200 in the third state S3, to direct the NFSM 200 to make a fifth state transition T5 from the third state S3 to the first state S1, or to direct the NFSM 200 to make a sixth state transition T6 from the third state S3 to the second state S2.

It should be understood that the state transitions described above are examples. In a particular implementation, certain transitions may not be possible (e.g., the transition probability will always be equal to zero).

Figure 3:
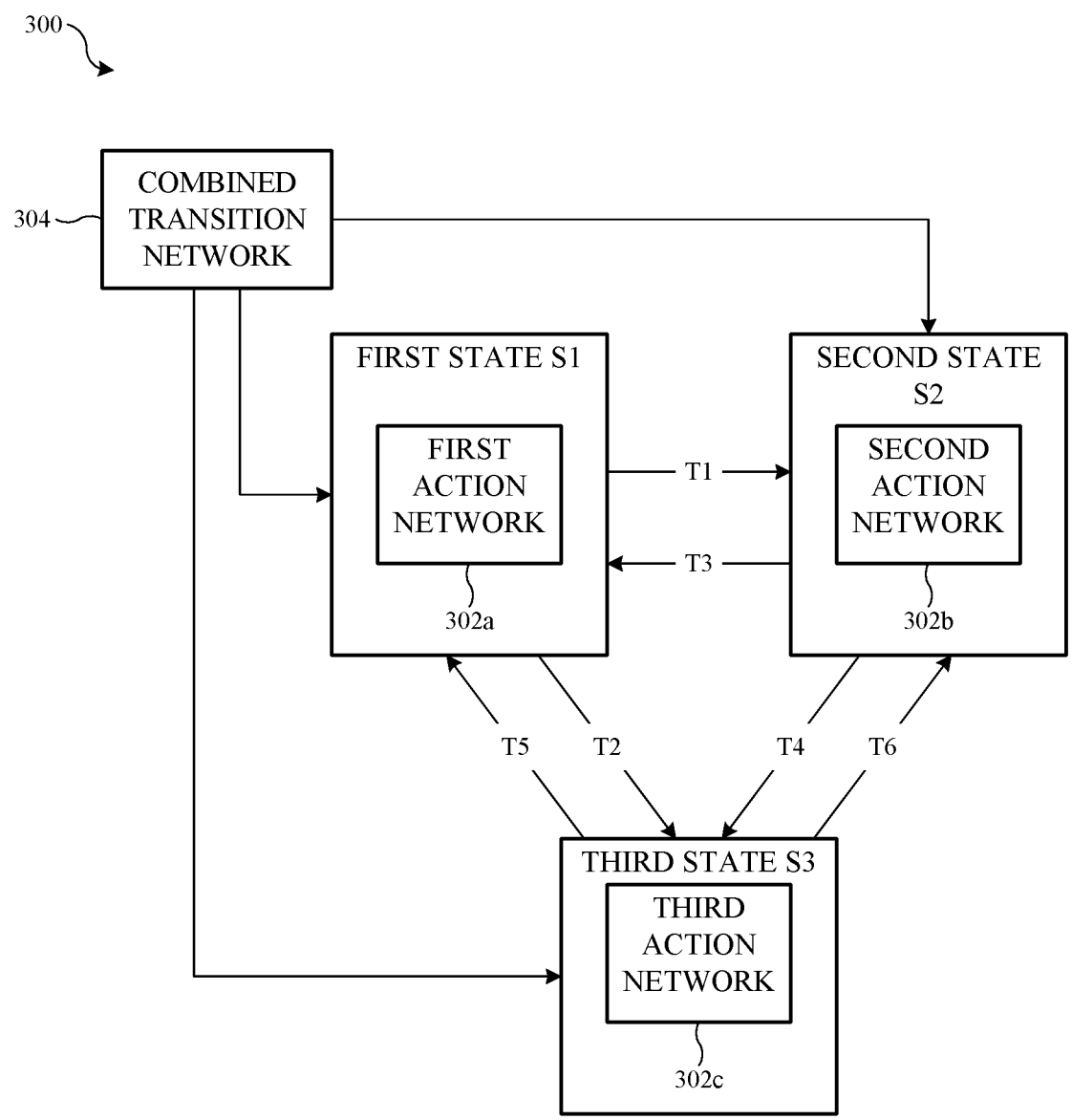
FIG. 3 is a block diagram that shows a neural finite state machine according to a third example.

FIG. 3 is a block diagram that shows a neural finite state machine (NFSM) 300 according to a third example. The NFSM 300 includes a first state S1, a second state S2, and a third state S3. It should be understood that the NFSM 300 can be implemented such that it has any number of states.

The first state S1 is implemented by a first action network 302*a*. The second state S2 is implemented by a second action network 302*b*. The third state S3 is implemented by a third action network 302*c*. A combined transition network 304 is utilized to control all state transitions.

The first action network 302*a*, the second action network 302*b*, and the third action network 302*c* are policies, each implemented using a separate machine learning model (e.g., a deep neural network), that control the actions determined by the NFSM 300. Thus, the first action network 302*a*, the second action network 302*b*, and the third action network 302*c* cooperate to define a state-dependent action policy for the NFSM 300. Combined operation of the first action network 302a, the second action network 302b, and the third action network 302c is as described with respect to the state-dependent action policy 102 of the NFSM 100, except as otherwise stated herein.

The combined transition network 304 is implemented using a machine learning model (e.g., a deep neural network) that is configured to control all of the state transitions for the NFSM 300. Thus, the combined transition network 304 serves as a state-dependent transition policy for the NFSM 300, and operation of the combined transition network 304 is as described with respect to the state-dependent transition policy 104 of the NFSM 100, except as otherwise stated herein.

The combined transition network 304 uses the current agent state as an input, as described with respect to the current agent state 108 of the NFSM 100. The combined transition network 304 uses environment states as inputs, as described with respect to the environment states 106 of the NFSM 100.

In the first state S1, the combined transition network 304 is operable to maintain operation of the NFSM 300 is the first state S1, to direct the NFSM 300 to make a first state transition T1 from the first state S1 to the second state S2, or to direct the NFSM 300 to make a second state transition T2 from the first state S1 to the third state S3.

In the second state S2, the combined transition network 304 is operable to maintain operation of the NFSM 300 in the second state S2, to direct the NFSM 300 to make a third state transition T3 from the second state S2 to the first state S1, or to direct the NFSM 300 to make a fourth state transition T4 from the second state S2 to the third state S3.

In the third state S3, the combined transition network 304 is operable to maintain operation of the NFSM 300 in the third state S3, to direct the NFSM 300 to make a fifth state transition T5 from the third state S3 to the first state S1, or to direct the NFSM 300 to make a sixth state transition T6 from the third state S3 to the second state S2.

Figure 4:
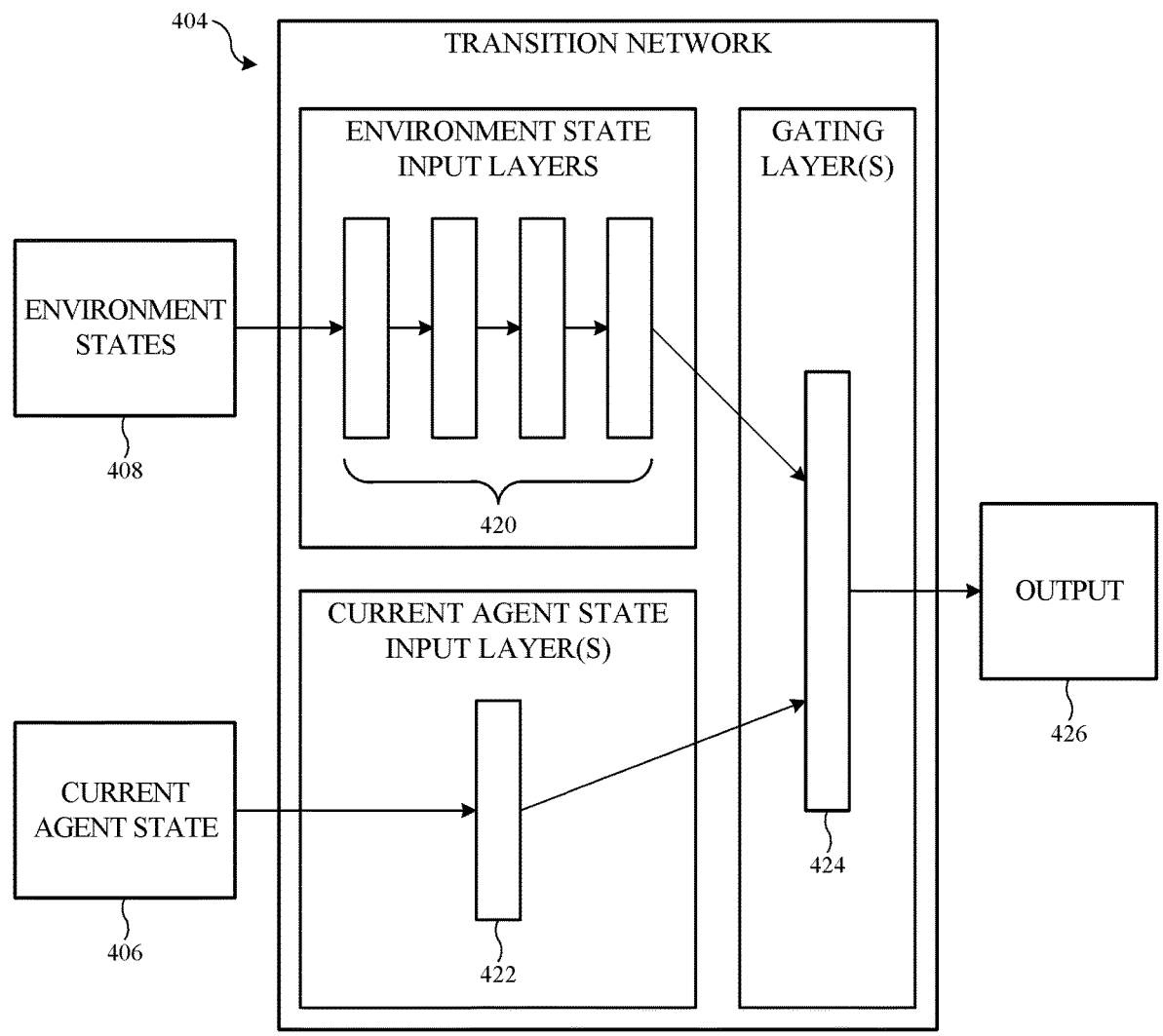
FIG. 4 is a block diagram that shows a transition network.

FIG. 4 is a block diagram that shows a transition network 404 according to an example. The transition network 404 may be implemented in the form of a machine learning model, which in this example is a deep neural network. The transition network 404 can be used to control state transitions for an NFSM regardless of its current state, by using the current state of the NFSM as an input in a weight-sharing and gating arrangement. The transition network 404 may incorporated in a neural finite state machine, such as the NFSM 100, the NFSM 200, or the NFSM 300, and the descriptions of these systems are applicable except as stated otherwise. As one example, the configuration of the transition network 404 be used to implement the combined transition network 304 of the NFSM 300.

The transition network 404 includes a large number of interconnected processing elements (e.g., "neurons") that are arranged in layers. In the transition network 404, inputs are processed separately by each of a first group of one or more layers and a second group of one or more layers. The outputs of these layers are provided to a third group of one or more layers, which produces a final output for the transition network 404.

In the illustrated example, the transition network 404 processes inputs using environment state input layers 420 and a current agent state input layer 422 (which may include one or more layers), and generates outputs using a gating layer 424 (which may include one or more layers). The transition network 404 receives environment states 408 (e.g., current environment states) and a current agent state 406 as inputs and generates an output 426. The output 426 includes information that is used by the NFSM to determine whether to transition to a different agent state. As one example, the output 426 may include transition probabilities. Transition probabilities are an output regarding transitions between the agent states. The transition probabilities are values that specify, for each state that the NFSM can operate in, the probability that transitioning to the respective state will cause the NFSM to act in an intended manner. When a transition probability for a particular state exceeds a threshold value, a transition can be made to that state.

The environment state input layers 420 receive the environment states 408 as inputs and process them. As an example, the environment states 408 may be provided to the environment state input layers 420 in the form of a feature vector that encodes information regarding the environment in terms of parameters that each have corresponding values. The environment state input layers 420 are trained to process the environment states to identify features that are related to transition of the NFSM between states. The environment state input layers 420, in the illustrated implementation, do not consider the current state of the NFSM. Instead, the information contained in the environment states 408 is processed without regard to the state of the NFSM, and features determined by the environment state input layers 420 are passed to the gating layer 424.

The current agent state input layer 422 receives the current agent state 406 as an input. As an example, the current agent state 406 may be encoded as a one-hot vector that includes a value for each state, with the value corresponding to the currently active state set equal to one. Any other suitable type of encoding can be used for the information that describes the current agent state 406.

The outputs of the current agent state input layer 422 are provided as inputs to the gating layer 424 and are used to control gating of the activations from the environment state input layers 420. Gating based on the current agent state 406 through the current agent state input layer 422 causes the output 426 of the transition network 404 to be dependent on the current agent state 406.

To summarize, the transition network 404 may include a first group of one or more input layers that process the environment states 408 (e.g., the environment state input layers 420), a second group of one or more input layers that process the current agent state 406 (e.g., the current agent state input layer 422), and a group of one or more output layers (e.g., the gating layer 424) that receive information from the first group of one or more input layers and the second group of one or more input layers and generate the output 426 regarding transitions between the agent states, which may be transition probabilities that are used to judge whether a transition should be made (e.g., when the transition probability exceeds a threshold value). This architecture improves the operation the NFSM in which it is included by reducing the number of independent models that are trained, stored, and used, which in turn increases the operational efficiency of the computing device that is used to implement the NFSM.

It should be understood that the architecture described for the transition network 404 could be applied to implement a policy network, such as the state-dependent action policy 102 of the NFSM 100. In such an implementation, the output 426 would be the action to be taken by an agent under direction of the NFSM.

Figure 5:
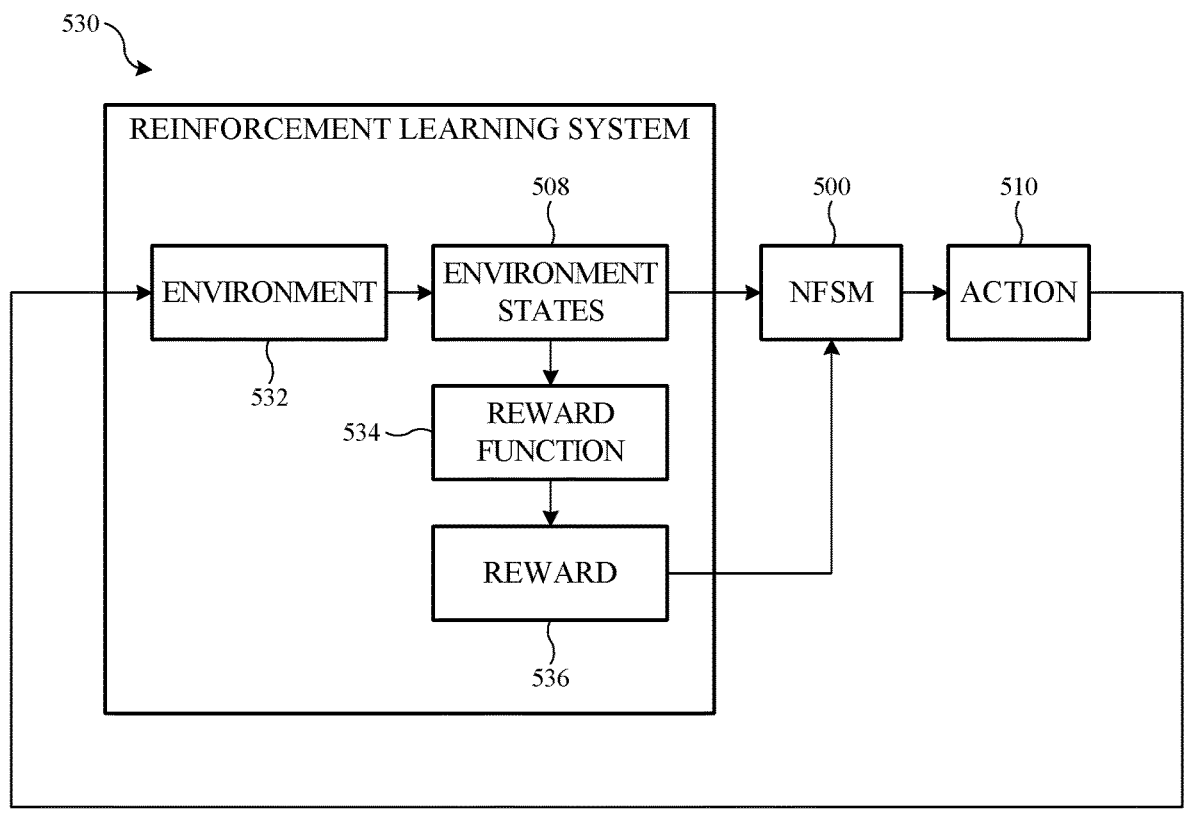
FIG. 5 is a block diagram that shows a reinforcement learning system.

FIG. 5 is a block diagram that shows a reinforcement learning system 530 according to an example. The reinforcement learning system uses an environment 532 that is described by environment states 508 (e.g., current environment states), which may be a real environment or a simulated environment. The reinforcement learning system 530 trains an NFSM 500 to determine an action 510 that, under a given set of environment states, satisfy criteria specified by a reward function 534. At each step (e.g., time step), the NFSM 500 determines the action 510 in the manner previously discussed with respect to the NFSM 100, the NFSM 200, and the NFSM 300. The action 510 is applied to the environment 532 and the environment states 508 are updated based on the action. The environment states 508 are used as inputs to the reward function 534 to determine a reward 536. According to reinforcement learning techniques, the reward 536 is utilized to update the policy parameters (e.g., neural network weights) of one or more policies that are included in the NFSM 500. The policies of the NFSM 500 are updated dependent on the agent state during the current time step.

The reinforcement learning system 530 utilizes reinforcement learning techniques to train the NFSM 500. As one example, the reinforcement learning techniques that are used to train the NFSM 500 may be modeled using the Markov Decision Process (MDP) framework. The MDP consists of a state space S, an action space A, and a reward function r(s, a): $S \times A \rightarrow \mathbb{R}$. The model of the environment is p(s'|s, a) which specifies the probability of transitioning to state s' when starting from state s and executing action a while in state s. The policy function $\pi_\theta(a|s)$, parameterized by policy parameters θ, specifies the distribution over actions a given a state s.

The value $p^\pi(s)$ denotes the stationary distribution over the state space given that policy π is followed. The total discounted reward $r_t^y$, the value function $V^\pi(s)$, and the state-action value function $Q^\pi(s, a)$ are given in Equations 1-3, where $y \in [0.0, 1.0]$ is the discount factor.

$$r_t^y = \sum_{i=t}^{\infty} y^{i-t}(s_i, a_i) \quad (1)$$

$$V^\pi(s) = \mathbb{E}[r_1^y | S_1 = s, \pi] \quad (2)$$

$$Q^\pi(s, a) = \mathbb{E}[r_1^y | S_1 = s, A_1 = a, \pi] \quad (3)$$

Reinforcement learning consists of a class of algorithms that can be used to find an optimal policy for a Markov Decision Process problem. Reinforcement learning algorithms seek to find the policy (via the policy parameters θ) that maximizes the average expected total discount reward.

The policy function $\pi_\theta(a|s)$: S→A maps any given state s onto an action a. It can be very general, from a table lookup to a parameterized deep neural network. An NFSM specifies a class of policies that are more constrained then general DNN policies. Therefore, any algorithms that are used for deep reinforcement learning can be used to learn an NFSM. Examples of algorithms that can be used to learn an NFSM include a gradient free evolutionary strategies algorithm and a policy gradient training algorithm.

Evolutionary strategies can be used for maximizing the expected reward while avoiding the need for computing gradients. Evolutionary strategies are a family of black box optimization functions which do not assume the gradient of the objective function with respect to policy parameters are known or even exists. Evolutionary strategies represent the model parameters θ as being sampled from a distribution p. Let F(θ) represent the reward obtained by policy θ, the gradient on p is computed according to Equation 4.

$$\nabla_p \mathbb{E}_{\theta \sim p} F(\theta) = \{F(\theta) \nabla_p \log p(\theta)\} \quad (4)$$

As is known in the art, policy gradient methods can be utilized to directly optimize the policy parameters θ without using value function approximations. In particular, the expected average reward function is directly optimized by finding the gradient of the policy function parameters. The objective function can be written as shown in Equation 5, and previous work has shown that the gradient can be expressed as per Equation 6.

$$J(\pi_\theta) = \int_S p^\pi(s) \int_A \pi_\theta(a|s) r(a,s) da ds \quad (5)$$

$$\nabla_\theta J = \mathbb{E} \nabla_\theta \log \pi_\theta(a|s) A(s,a) \quad (6)$$

In Equation 6, A is typically an advantage function and but other functions can be used. As an example, using sample return leads to the REINFORCE algorithm.

In an example implementation of the reinforcement learning system 530 the NFSM 500 may be trained to implement a simple traffic control system. In this example, right-of-way assignment at an intersection is controlled by four traffic signal lights. Vehicles populate both north-south bound and east-west bound and travel straight ahead. The action space consists of the state of each traffic signal. The agents in the environment are vehicles, where they have two continuous actions: acceleration and steering. Vehicle dynamics are modeled according to a bicycle model of kinematics. These agents have the so-called adaptive cruise control capability: they have a desired velocity but will brake to avoid colliding with another vehicle. In addition, the agents observe the traffic signal for their lane, and will stop when the light is either yellow or red.

In this environment, if all traffic signals were set to green for example, it will lead to many crashes as vehicles do not react to cross traffic. The goal here is to operate the traffic signals in a way that maximizes traffic flow while avoiding crashes. Every episode is run for 500 timesteps, where each timestep represents 100 milliseconds of real-life simulation. The reward function is as shown in Equation 7.

$$R = -10.0 * N_c - 0.1 * M_{wait} \quad (7)$$

In Equation 7, Nc is the total number of collisions for an episode and $M_{wait}$ is the number of timesteps in which a vehicle has waited for more than 20 seconds.

Given our environment and objective function, the NFSM is designed with two states S: A and B. A neural network is trained to predict the probability of transitions at time t:$p(S_{t+1}|S_t)$. In addition, the neural network is trained to output the state of a traffic signal at both state A and B. The control of the traffic signal state is implemented in a non-data-dependent manner, such as by learning four Bernoulli random variables for each of the two states.

The parameters for the transition network are updated using Equation 4. However, for the additional Bernoulli random variables, the formulation shown in Equation 8 is used, for which the Bernoulli probability is given in Equation 9.

$$\nabla_p = \mathbb{E}_{y \sim P(y;p)} \left\{ F(y) \frac{y-p}{p(1-p)} \right\} \quad (8)$$

$$P(y;p) = p^y(1-p)^{1-y}, \text{ where } y = \{0, 1\} \quad (9)$$

In the traffic control system example, the resulting network has a first state and a second state that correspond to first and second illumination states for traffic signals, which correspond to different assignments of right-of-way. For example, traffic in a first direction (e.g., east-west traffic) may be assigned right-of-way in the first state, and traffic in a second direction (e.g., north-south traffic) may be assigned right-of-way in the second state. The illumination states are determined according to a policy that is learned by the NFSM and implemented using one or more neural networks (i.e., policy networks). State changes between the first and second states are controlled by a learned transition network. As an example, a traffic control system may be implemented according to this description in a system that includes a first policy network that controls illumination states for traffic signals in a first state; a second policy network that controls illumination states for traffic signals in a second state; and a transition network that determines a transition probability for a state change between the first state and the second state, and causes the state change if the transition probability exceeds a threshold value.

The techniques described with respect to the reinforcement learning system 530 can be applied to more complex control scenarios. In a simple autonomous driving example, an NFSM is defined with 4 states: lane following, lane change left, lane change right, and Lane revert, show in left panel of FIG. 6. In the lane follow state, the vehicle is only allowed to change velocity on a fixed path (e.g., the center of the road), in the lane revert state, the vehicle attempts to return to the closest lane, in the lane change left state, the vehicle attempts to perform a lane change to the left, and in the lane change right state, the vehicle attempts to perform a lane change to the right. This model can be expanded to include additional states, such a steering state, an acceleration state, and emergency stop state, and sub-states for the lane follow state, such as stop, go, and decelerate.

The system described above may be implemented in the form of a vehicle control system that includes a first policy network that controls motion of a vehicle in a lane following state in which the vehicle remains in a current lane on a roadway; a second policy network that controls motion of a vehicle in a lane change state in which the vehicle moves from the current lane to a different lane on the roadway; and a transition network that determines a transition probability for a state change between the lane following state and the lane change state, and causes the state change if the transition probability exceeds a threshold value.

Figure 6:
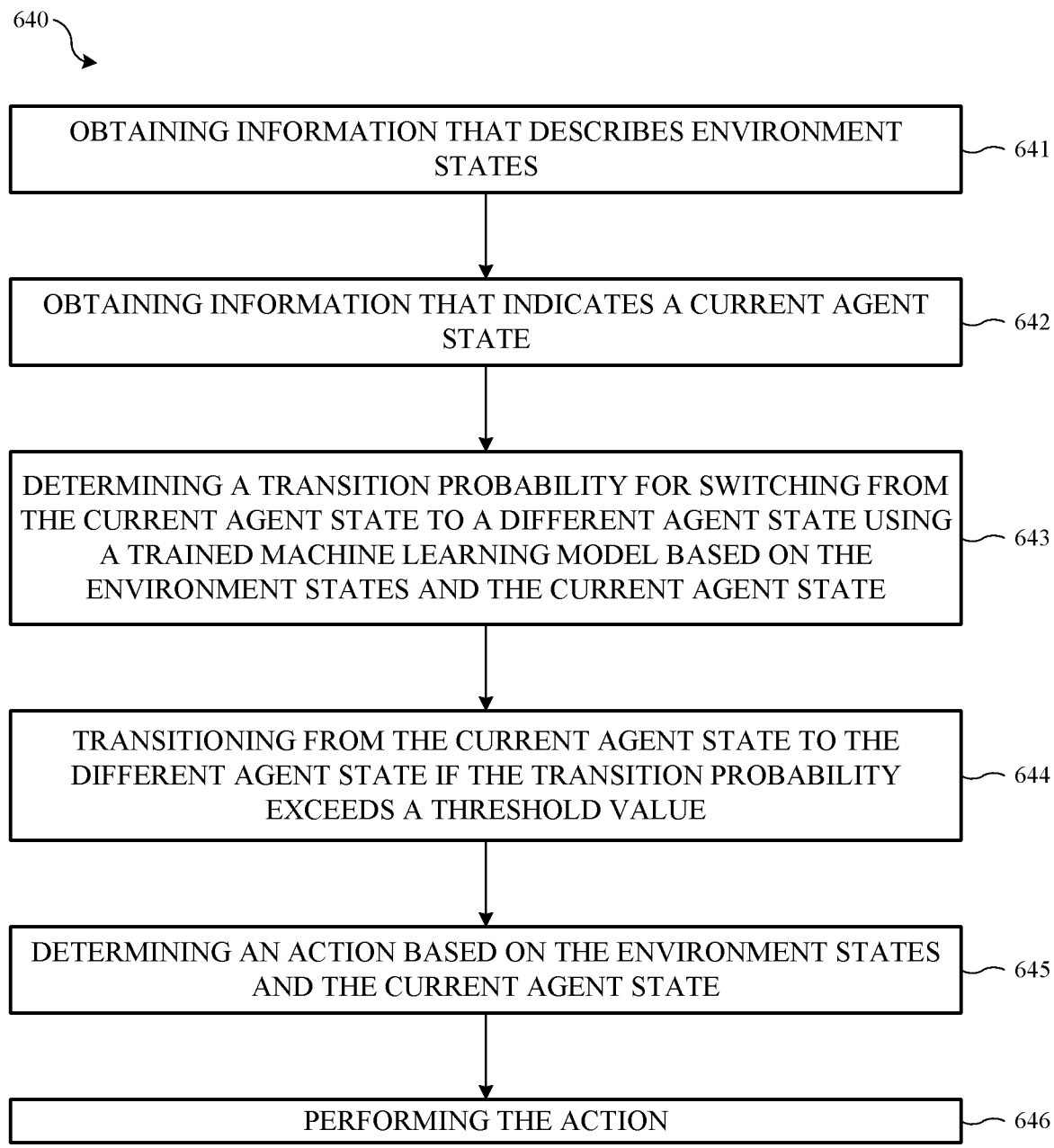
FIG. 6 is a flowchart that shows an example of a control process.

FIG. 6 is a flowchart that shows an example of a control process 640 that utilizes a neural finite state machine, such as the NFSM 100, the NFSM 200, or the NFSM 300. Operations of the control process 640 can be caused, controlled, or performed by a computing device. The computing device is provided with instructions that are stored in a storage device or a memory device, and a processor that is operable to execute the program instructions. When executed by the processor, the program instructions cause the computing device to perform the operations of the control process 640 as described herein.

Operation 641 includes obtaining information that describes environment states. The information that describes environment states may be as described with respect to the environment states 106 of the NFSM 100. Information can be obtained, for example, by reading it from a sensor, by receiving it in a data transmission, by accessing it from a storage device, or in any other suitable manner.

Operation 642 includes obtaining information that indicates a current agent state. The information that describes current agent state may be as described with respect to the current agent state 108 of the NFSM 100. Information can be obtained, for example, by reading it from a sensor, by receiving it in a data transmission, by accessing it from a storage device, or in any other suitable manner.

Operation 643 includes determining a transition probability for switching from the current agent state to a different agent state using a trained machine learning model based on the environment states and the current agent state. The transition probability is an output regarding transitions between the agent states. Determining a transition probability can be performed in the manner described with respect to the state-dependent transition policy 104 of the NFSM 100, the first through third transition networks 204a-204c of the NFSM 200, the combined transition network 304 of the NFSM 300, and/or the transition network 404.

Operation 644 includes transitioning from the current agent state to the different agent state if the transition probability exceeds a threshold value. Operation 645 includes determining an action based on the environment states and the current agent state, and operation 646 includes and performing the action. Operations 644 through 646 can be performed in the manner described with respect to, as examples, the NFSM 100, the NFSM 200, and/or the NFSM 300. In operation 646, the action may be performed by a simulated agent in a simulated environment, or the action may be performed by a real agent in a real environment.

As an example, the control process 640 can be implemented using a system that includes a first agent policy that is operable to control actions of an agent in a first state; a second agent policy that is operable to control actions of the agent in a second state; and a transition network that is configured to determine a transition probability for a state change between the first agent state and the second agent state based on environment states. The control executed by the system is consistent with the description of the control process 640.

Figure 7:
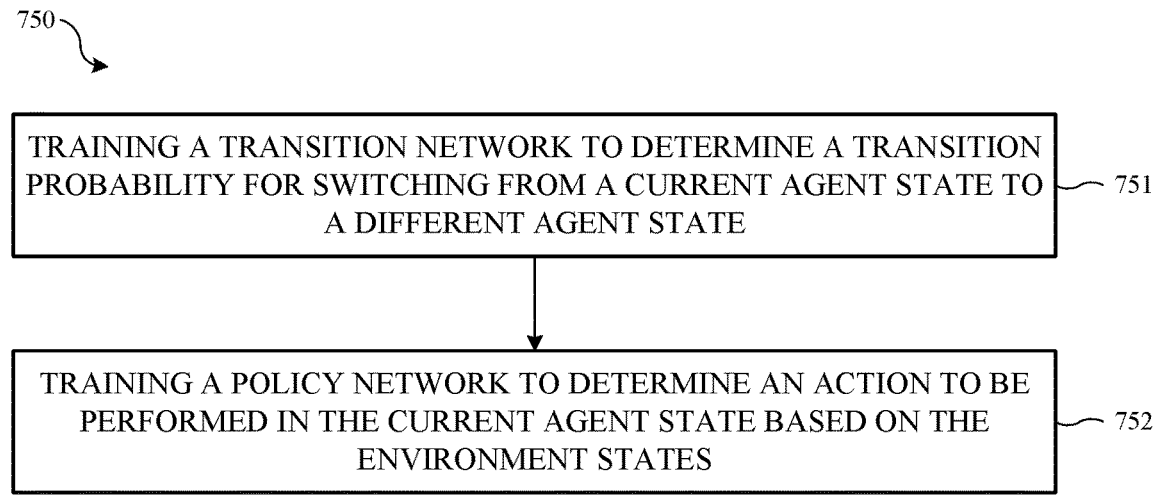
FIG. 7 is a flowchart that shows an example of a training process.

FIG. 7 is a flowchart that shows an example of a training process 750 for training components of a neural finite state machine, such as the NFSM 100, the NFSM 200, or the NFSM 300. Operations of the training process 750 can be caused, controlled, or performed by a computing device. The computing device is provided with instructions that are stored in a storage device or a memory device, and a processor that is operable to execute the program instructions. When executed by the processor, the program instructions cause the computing device to perform the operations of the training process 750 as described herein.

Operation 751 includes training a transition network to determine a transition probability for switching from a current agent state to a different agent state based on environment states. The current agent state and the different agent state are selected from a predetermined group of agent states. The transition network can be configured in the manner described with respect to transition policies and networks associated with the NFSM 100, the NFSM 200, the NFSM 300, and/or the transition network 404. Training can be performed, for example, as described with respect to the reinforcement learning system 530, or according to other suitable known methods.

In some implementations, training the transition network is performed using a reinforcement learning system. The reinforcement learning system may include a reward function that determines a reward based on an action determined by a policy network that corresponds to the current agent state. As an example, reinforcement learning can be implemented in the manner described with respect to the reinforcement learning system 530.

Operation 752 includes training a policy network to determine an action to be performed in the current agent state based on the environment states. The policy network trained in operation 752 can be configured in the manner described with respect to action policies and networks associated with the NFSM 100, the NFSM 200, and/or the NFSM 300. Training can be performed, for example, as described with respect to the reinforcement learning system 530, or according to other suitable known methods.

Subsequent to training, the transition network and the policy network can be incorporated in an NFSM and utilized, for example, in the control process 640 as previously described.

Figure 8:
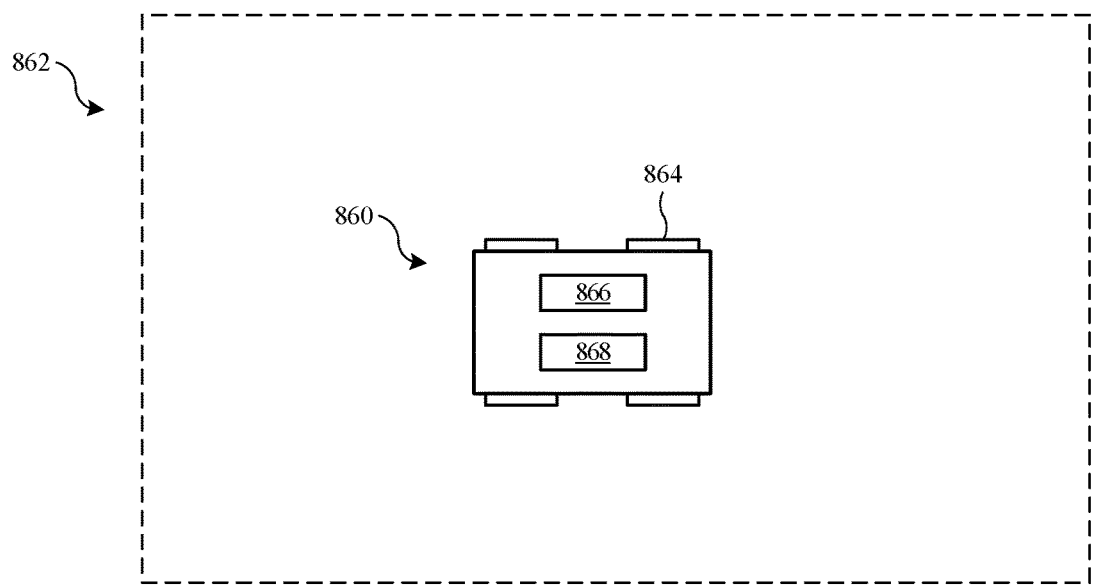
FIG. 8 is an illustration that shows an agent that is operating in an environment.

FIG. 8 is an illustration that shows an agent 860 that is operating in an environment 862. As an example, the agent 860 may be an autonomous system that is configured to operate in the environment 862, by performing actions such as by navigating using actuators 864 (e.g., motor-driven wheels) and/or other actions. The agent 860 obtains information that describes environment states (e.g., the environment states 106) using sensors 866. This information is used by an NFSM 868 that is incorporated in the agent 860, which determines actions. The agent 860 then performs the actions, for example, using the actuators 864.

Figure 9:
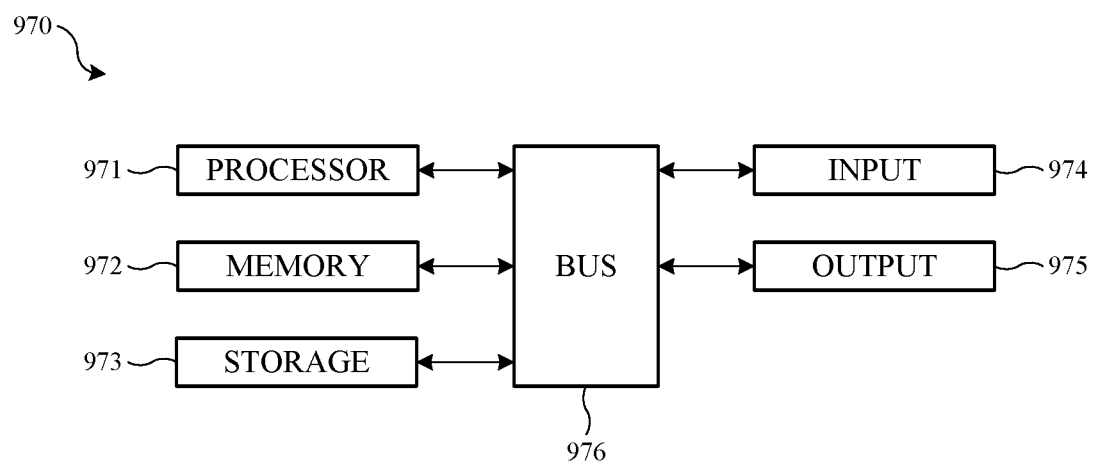
FIG. 9 is an illustration that shows an example of a hardware configuration for a computing device.

FIG. 9 is an illustration that shows an example of a hardware configuration for a computing device that can be used to implement the system described herein. The computing device 970 may include a processor 971, a memory 972, a storage device 973, one or more input devices 974, and one or more output devices 975. The computing device 970 may include a bus 976 or a similar device to interconnect the components for communication. The processor 971 is operable to execute computer program instructions and perform operations described by the computer program instructions. As an example, the processor 971 may be a conventional device such as a central processing unit. The memory 972 may be a volatile, high-speed, short-term information storage device such as a random-access memory module. The storage device 973 may be a non-volatile information storage device such as a hard drive or a solid-state drive. The input devices 974 may include any type of human-machine interface such as buttons, switches, a keyboard, a mouse, a touchscreen input device, a gestural input device, or an audio input device. The output devices 975 may include any type of device operable to provide an indication to a user regarding an operating state, such as a display screen or an audio output.

As described above, one aspect of the present technology is the gathering and use of data available from various sources to for processing by a neural finite state machine. The present disclosure contemplates that in some instances, this gathered data may include personal information data that uniquely identifies or can be used to contact or locate a specific person or may be used in the context of a system that gathers and stores such information. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Accordingly, use of such personal information data enables users to benefit from functions performed by automated systems. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select the specific services and functions that personal information data will be used for. In yet another example, users can select to limit the length of time that personal data is stored or used for specific services and functions. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, services can be provided based on non-personal information data or a bare minimum amount of personal information.

What is claimed is:

1. A system, comprising:
one or more computing devices;
a finite state machine that is implemented using the one or more computing devices to define a state-dependent action policy of the finite state machine and a state-dependent transition policy of the finite state machine:
wherein the state-dependent action policy determines an action based on environment information and a current agent state selected from a predetermined group of agent states that include a first agent state and a second agent state,
wherein the state-dependent action policy includes a first action policy implemented using a first trained neural network that determines the action when the current agent state is the first agent state,
wherein the state-dependent action policy includes a second action policy implemented using a second trained neural network that determines the action when the current agent state is the second agent state
wherein the state-dependent transition policy is implemented using one or more trained neural networks and is configured to control transitions between agent states from the predetermined group of agent states based on the environment information, and
wherein the state-dependent action policy and the state-dependent transition policy of the finite state machine are trained using a reward function that updates the parameters of the state-dependent action policy and the state-dependent transition policy during training according to actions determined by the state-state dependent action policy and the agent state corresponding to each of the actions; and
an agent that is controlled according to the action determined by the state-dependent action policy of the finite state machine.

2. The system of claim 1, wherein the one or more trained neural networks of the state-dependent transition policy include a first transition network that controls transitions out of the first agent state and a second transition network that controls transitions out of the second agent state.

3. The system of claim 1, wherein:
the one or more neural networks of the state-dependent transition policy includes a single transition network that receives the environment information as a first input and receives the current agent state as a second input,
the single transition network includes a first group of one or more input layers that process the environment information to define environment activations,
the single transition network includes a second group of one or more input layers that process the current agent state to define a state-based gating input, and
the single transition network includes a group of one or more output layers that receive the environment activations and the state-based gating input as inputs and control gating of the environment activations according to the state-based gating input to generate an output regarding transitions between the agent states.

4. The system of claim 1, wherein:
the one or more trained neural networks of the state-dependent transition policy include a first transition network and a second transition network,
wherein the first transition network is utilized only when the current agent state is the first agent state,
wherein the first transition network is configured to determine whether to transition from the first agent state to a different agent state from the predetermined group of agent states based on the environment information,
wherein the second transition network is utilized only when the current agent state is the second agent state, and
wherein the second transition network is configured to determine whether to transition from the second agent state to a different agent state from the predetermined group of agent states based on the environment information.

5. The system of claim 1, wherein the state-dependent transition policy determines a transition probability for switching from the current agent state to a different agent state from the predetermined group of agent states, and the state-dependent transition policy uses the transition probability to control transitions between the agent states from the predetermined group of agent states.

6. The system of claim 1, wherein the state-dependent action policy and the state-dependent transition policy of the finite state machine are trained using a reinforcement learning system that includes the reward function.

7. The system of claim 1, wherein the agent is a simulated agent that is controlled according to the action in a simulated environment.

8. The system of claim 1, wherein the agent is a real agent that is controlled according to the action in a real environment.

9. A method, comprising:
determining that a current agent state of a finite state machine corresponds to one of a first agent state or a second agent state from a predetermined group of agent states;
in accordance with determining that the current agent state of the finite state machine corresponds to the first agent state, determining an action based on environment information using a first action policy of a state-dependent action policy, wherein the first action policy is implemented using a first trained neural network;
in accordance with determining that the current agent state of the finite state machine corresponds to the second agent state, determining the action based on the environment information using a second action policy of the state-dependent action policy, wherein the second action policy is implemented using a second trained neural network;
controlling a transition between agent states from the predetermined group of agent states based on the environment information using a state-dependent transition policy that is implemented using one or more trained neural networks, wherein the state-dependent action policy and the state-dependent transition policy of the finite state machine are trained using a reward function that updates the parameters of the state-dependent action policy and the state-dependent transition policy during training according to actions determined by the state-dependent action policy and the agent state corresponding to each of the actions; and controlling an agent according to the action determined by the state-dependent action policy.

10. The method of claim 9, wherein the one or more trained neural networks of the state-dependent transition policy include a first transition network that controls transitions out of the first agent state and a second transition network that controls transitions out of the second agent state.

11. The method of claim 9, wherein:
the one or more neural networks of the state-dependent transition policy includes a single transition network that receives the environment information as a first input and receives the current agent state as a second input,
the single transition network includes a first group of one or more input layers that process the environment information to define environment activations,
the single transition network includes a second group of one or more input layers that process the current agent state to define a state-based gating input, and
the single transition network includes a group of one or more output layers that receive the environment activations and the state-based gating input as inputs and control gating of the environment activations according to the state-based gating input to generate an output regarding transitions between the agent states.

12. The method of claim 9, wherein:
the one or more trained neural networks of the state-dependent transition policy include a first transition network and a second transition network, the first transition network is utilized only when the current agent state is the first agent state, and the second transition network is utilized only when the current agent state is the second agent state,
in accordance with determining that the current agent state of the finite state machine corresponds to the first agent state, controlling the transition between agent states from the predetermined group of agent states comprises determining, by the first transition network, whether to transition from the first agent state to a different agent state from the predetermined group of agent states based on the environment information, and
in accordance with determining that the current agent state of the finite state machine corresponds to the second agent state, controlling the transition between agent states from the predetermined group of agent states comprises determining, by the second transition network, whether to transition from the second agent state to a different agent state from the predetermined group of agent states based on the environment information.

13. The method of claim 9, wherein controlling the transition between agent states from the predetermined group of agent states includes determining, by the state-dependent transition policy, a transition probability for switching from the current agent state to a different agent state from the predetermined group of agent states.

14. The method of claim 9, wherein the state-dependent action policy and the state-dependent transition policy of the finite state machine are trained using a reinforcement learning system that includes the reward function.

15. The method of claim 9, wherein the agent is a simulated agent that is controlled according to the action in a simulated environment.

16. The method of claim 9, wherein the agent is a real agent that is controlled according to the action in a real environment.

17. A non-transitory computer-readable storage device including computer-interpretable program instructions, wherein the computer-interpretable program instructions, when executed by one or more computing devices, cause the one or more computing devices to perform operations, the operations comprising:
determining that a current agent state of a finite state machine corresponds to one of a first agent state or a second agent state from a predetermined group of agent states;
in accordance with determining that the current agent state of the finite state machine corresponds to the first agent state, determining an action based on environment information using a first action policy of a state-dependent action policy, wherein the first action policy is implemented using a first trained neural network;
in accordance with determining that the current agent state of the finite state machine corresponds to the second agent state, determining the action based on the environment information using a second action policy of the state-dependent action policy, wherein the second action policy is implemented using a second trained neural network;
controlling a transition between agent states from the predetermined group of agent states based on the environment information using a state-dependent transition policy that is implemented using one or more trained neural networks, wherein the state-dependent action policy and the state-dependent transition policy of the finite state machine are trained using a reward function that updates the parameters of the state-dependent action policy and the state-dependent transition policy during training according to actions determined by the state-dependent action policy and the agent state corresponding to each of the actions; and
controlling an agent according to the action determined by the state-dependent action policy.

18. The non-transitory computer-readable storage device of claim 17, wherein the one or more trained neural networks of the state-dependent transition policy include a first transition network that controls transitions out of the first agent state and a second transition network that controls transitions out of the second agent state.

19. The non-transitory computer-readable storage device of claim 17, wherein:
the one or more neural networks of the state-dependent transition policy includes a single transition network that receives the environment information as a first input and receives the current agent state as a second input,
the single transition network includes a first group of one or more input layers that process the environment information to define environment activations,
the single transition network includes a second group of one or more input layers that process the current agent state to define a state-based gating input, and
the single transition network includes a group of one or more output layers that receive the environment activations and the state-based gating input as inputs and control gating of the environment activations according to the state-based gating input to generate an output regarding transitions between the agent states.

20. The non-transitory computer-readable storage device of claim 17, wherein:

the one or more trained neural networks of the state-dependent transition policy include a first transition network and a second transition network, the first transition network is utilized only when the current agent state is the first agent state, and the second transition network is utilized only when the current agent state is the second agent state, in accordance with determining that the current agent state of the finite state machine corresponds to the first agent state, controlling the transition between agent states from the predetermined group of agent states comprises determining, by the first transition network, whether to transition from the first agent state to a different agent state from the predetermined group of agent states based on the environment information, and in accordance with determining that the current agent state of the finite state machine corresponds to the second agent state, controlling the transition between agent states from the predetermined group of agent states comprises determining, by the second transition network, whether to transition from the second agent state to a different agent state from the predetermined group of agent states based on the environment information.

21. The non-transitory computer-readable storage device of claim 17, wherein controlling the transition between agent states from the predetermined group of agent states includes determining, by the state-dependent transition policy, a transition probability for switching from the current agent state to a different agent state from the predetermined group of agent states.

22. The non-transitory computer-readable storage device of claim 17, wherein the state-dependent action policy and the state-dependent transition policy of the finite state machine are trained using a reinforcement learning system that includes the reward function.

23. The non-transitory computer-readable storage device of claim 17, wherein the agent is a simulated agent that is controlled according to the action in a simulated environment.

24. The non-transitory computer-readable storage device of claim 17, wherein the agent is a real agent that is controlled according to the action in a real environment.

* * * * *

UNITED STATES PATENT AND TRADEMARK OFFICE
CERTIFICATE OF CORRECTION

Page 1 of 1

PATENT NO. : 11,132,211 B1
APPLICATION NO. : 16/510261
DATED : September 28, 2021
INVENTOR(S) : Tang It is certified that error appears in the above-identified patent and that said Letters Patent is hereby corrected as shown below:

In the Claims

Column 15, Claim 1, Line 46, "state-state dependent" should read -- state-dependent --.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*